US011490201B2

(12) United States Patent
Ökvist et al.

(10) Patent No.: US 11,490,201 B2
(45) Date of Patent: Nov. 1, 2022

(54) DISTRIBUTED MICROPHONES SIGNAL SERVER AND MOBILE TERMINAL

(71) Applicant: Telefonaktiebolaget LM Ericsson (publ), Stockholm (SE)

(72) Inventors: Peter Ökvist, Luleå (SE); Stefan Wänstedt, Luleå (SE); Tommy Arngren, Södra Sunderbyn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/268,118

(22) PCT Filed: Aug. 16, 2018

(86) PCT No.: PCT/EP2018/072238
§ 371 (c)(1),
(2) Date: Feb. 12, 2021

(87) PCT Pub. No.: WO2020/035143
PCT Pub. Date: Feb. 20, 2020

(65) Prior Publication Data
US 2021/0204060 A1   Jul. 1, 2021

(51) Int. Cl.
*H04R 3/00* (2006.01)
*H04W 4/029* (2018.01)
(Continued)

(52) U.S. Cl.
CPC ............ *H04R 3/005* (2013.01); *G06F 3/162* (2013.01); *G06F 3/165* (2013.01); *G10L 25/78* (2013.01);
(Continued)

(58) Field of Classification Search
CPC ..... H04W 4/029; H04R 2430/01; H04R 3/00; G06F 3/162
(Continued)

(56) References Cited

U.S. PATENT DOCUMENTS 9,774,907 B1   9/2017  Bhageria et al.
2010/0268839 A1*  10/2010  Olivereau ............... H04W 4/02
                                                                709/231
(Continued)

FOREIGN PATENT DOCUMENTS

WO   2018064627 A1   4/2018

OTHER PUBLICATIONS

International Search Report and Written Opinion of the International Searching Authority for PCT International Application No. PCT/EP2018/072238 dated Mar. 29, 2019.

*Primary Examiner* — Yosef K Laekemariam
(74) *Attorney, Agent, or Firm* — Sage Patent Group (57) ABSTRACT

A distributed microphones signal server includes a network interface circuit that communicates with mobile terminals and a plurality of microphones that are geographically distributed. The server receives an audio request message containing a location of the mobile terminal, and selects a microphone from among the plurality of microphones responsive to the location of the mobile terminal. The server obtains an audio stream from the selected microphone, and communicates the audio stream to the mobile terminal. Related methods by a distributed microphones signal server are disclosed. Related computer program products and methods by a mobile terminal are disclosed.

20 Claims, 5 Drawing Sheets

(51) Int. Cl.
*G06F 3/16* (2006.01)
*G10L 25/78* (2013.01)
*H04R 1/40* (2006.01)
*H04R 3/04* (2006.01)
*H04W 88/02* (2009.01)

(52) U.S. Cl.
CPC ............... *H04R 1/406* (2013.01); *H04R 3/04* (2013.01); *H04W 4/029* (2018.02); *H04R 2201/405* (2013.01); *H04R 2420/07* (2013.01); *H04R 2430/01* (2013.01); *H04W 88/02* (2013.01)

(58) Field of Classification Search
USPC .............................. 381/91, 92, 111, 122, 355
See application file for complete search history.

(56) References Cited

U.S. PATENT DOCUMENTS

2011/0310865 A1* 12/2011 Kennedy ............... H04W 28/26
 370/328
2016/0258767 A1 9/2016 Nevrekar et al.
2016/0323498 A1* 11/2016 Krishnakumar ... H04N 5/23293

\* cited by examiner

DISTRIBUTED MICROPHONES SIGNAL SERVER AND MOBILE TERMINAL

CROSS REFERENCE TO RELATED APPLICATION

This application is a 35 U.S.C. § 371 national stage application of PCT International Application No. PCT/EP2018/072238 filed on Aug. 16, 2018, the disclosure and content of which is incorporated by reference herein in its entirety.

TECHNICAL FIELD

The present disclosure relates to a distributed microphones signal server, a mobile terminal, a method by a distributed microphones signal server, and a method by a mobile terminal.

BACKGROUND

It can often be challenging for people to pick up noise and other sounds from distant areas in city-like environments due to large physical obstructions that commonly occur between the listener and distant sound source(s) and due to the fainter sounds arriving from distant sources being drowned-out by more localized sound sources. For example, it can be difficult if not impossible for a person to hear sounds and resolve their direction when they occur a city block away at an intersection. In sharp contrast, the person may have much less problem hearing and determining direction of sounds occurring at that distance in less obstructive rural and nature environments.

Some personal-hearing improvement equipment provides amplification of received sounds along with active noise suppression, such as the Peltor XP WS device. However, these devices can fail to sense or adequately amplify sounds which occur at distances in city-like environments. Furthermore, sounds that are generated by sources which are near or on the person can be disproportionally amplified by such devices and render sounds from more distant sources inaudible to the person.

SUMMARY

Some embodiments disclosed herein are directed to a distributed microphones signal server that includes a network interface circuit, a processor, and a memory. The network interface circuit is configured to communicate with mobile terminals and a plurality of microphones that are geographically distributed. The processor is connected to the network interface circuit. The memory stores program code that is executed by the processor to perform operations. The operations include receiving an audio request message from a mobile terminal which contains a location of the mobile terminal. A microphone is selected from among the plurality of microphones responsive to the location of the mobile terminal. An audio stream is obtained from the microphone that is selected. The audio stream is communicated to the mobile terminal.

A potential advantage of these operations is that the distributed microphones signal server enables mobile terminals to receive audio streams from microphones among the array that are selected based on the locations of the mobile terminals. Other embodiments that are disclosed can provide further advantages of enabling a user of a mobile terminal to listen to one or more microphones that are selected, by the distributed microphones signal server, a defined distance ahead of where the user is traveling, where the user is looking, etc. When a plurality of microphones are selected by the distributed microphones signal server for communicating audio streams to a mobile terminal, the volume of individual ones of the audio streams can be separately adjusted based on the respective distances of the microphones from a location of the mobile terminal.

Some other embodiments disclosed herein are directed to a mobile terminal that includes a wireless network interface circuit, a processor connected to the wireless network interface circuit, and a memory storing program code that is executed by the processor to perform operations. The operations include obtaining a location of the mobile terminal, and transmitting an audio request message to a distributed microphones signal server. The audio request message contains the location of the mobile terminal and requests that the distributed microphones signal server select a microphone from among a plurality of microphones that are geographically distributed responsive to the location of the mobile terminal. An audio stream is received from the microphone that is selected. The audio stream is played through an audio output interface.

Related methods by distributed microphones signal servers and by mobile terminals are disclosed herein. Accordingly, other distributed microphones signal servers, mobile terminals, computer program products for mobile terminals, and corresponding methods according to embodiments will be or become apparent to one with skill in the art upon review of the following drawings and detailed description. It is intended that all such additional distributed microphones signal servers, mobile terminals, computer program products for mobile terminals, and corresponding methods be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments of the present disclosure are directed to providing operations that enable a user to have virtual binocular listening capabilities. A system is provided that includes a plurality of microphones that are geographically distributed, and which may include static microphones that are mounted at locations distributed across a city (e.g., microphones of security cameras) and may include mobile terminals (e.g., cellular phone, User Equipment, smart watch, tablet computer, wearable computer, etc.) that are carried by persons traveling in the city and/or which may be otherwise relocatable (e.g. flying drones). A mobile terminal having a specifically configured application, also referred to as an audio binocular application, can be operated by a user to request to listen ahead of where the user is traveling or where the user is presently looking. A distributed microphones signal server operates to select one or more microphones among the plurality based on the location, heading, directional velocity, and other characteristics of the mobile terminal, and to combine audio streams from the selected one or more microphones into a combined audio stream that is communicated to the mobile terminal. In this manner, the user is able to listen-in at microphones located proximate to future locations of the user while traveling and/or to listen-in at microphones located at distances in a direction that the user is presently looking.

Figure 1:
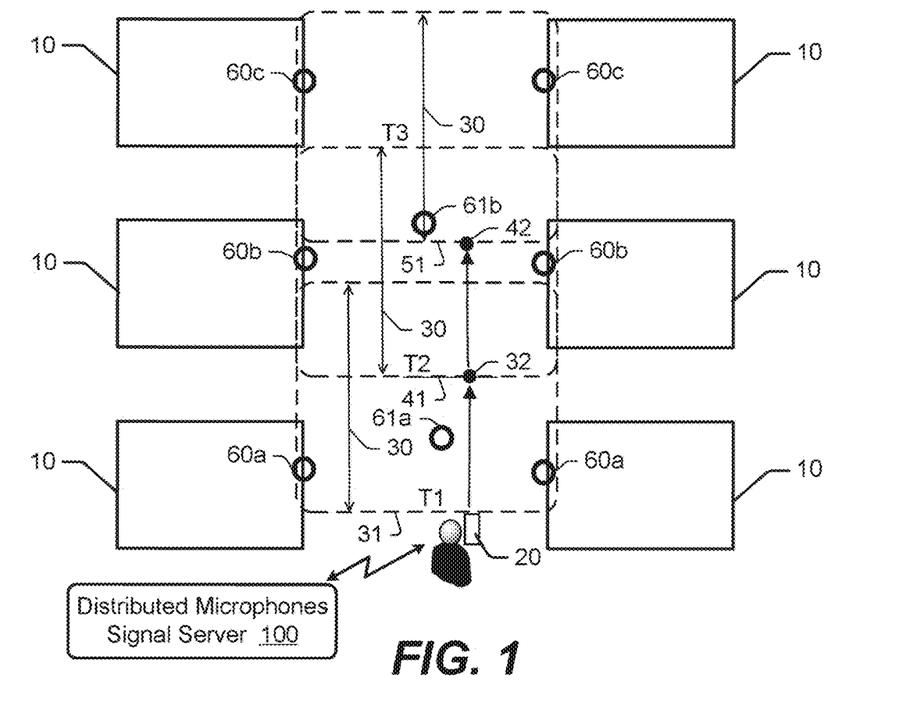
FIG. 1 illustrates a city environment and operations that are performed by distributed microphones signal server to select microphones from among a plurality of microphones responsive to a location of a mobile terminal according to some embodiments of the present disclosure.

FIG. 1 illustrates a city environment and operations that are performed by a distributed microphones signal server 100 (also referred to as "server" for brevity) to select microphones from among a plurality of microphones responsive to a location of a mobile terminal 20 according to some embodiments of the present disclosure.

Referring to FIG. 1, the mobile terminal 20 includes an audio binocular application 622 (FIG. 6) that is configured to communicate with the server 100 to receive an audio stream from one or more microphones that are selected among the plurality to provide a listen-ahead capability for where the mobile terminal is expected to be located in future. Microphones are distributed across an area of a city, which includes the illustrated spaced-apart buildings 10. Static microphones 60a, 60b, 60c may correspond to microphones of security cameras that are mounted on or near sides of the buildings 10. Moreover, mobile microphone 61a and 61b may correspond to microphones in other mobile terminals (also referred to as agent mobile terminals) that are traveling within the city and/or microphones on flyable drones that are commanded to move to selected locations within the city.

Figure 6:
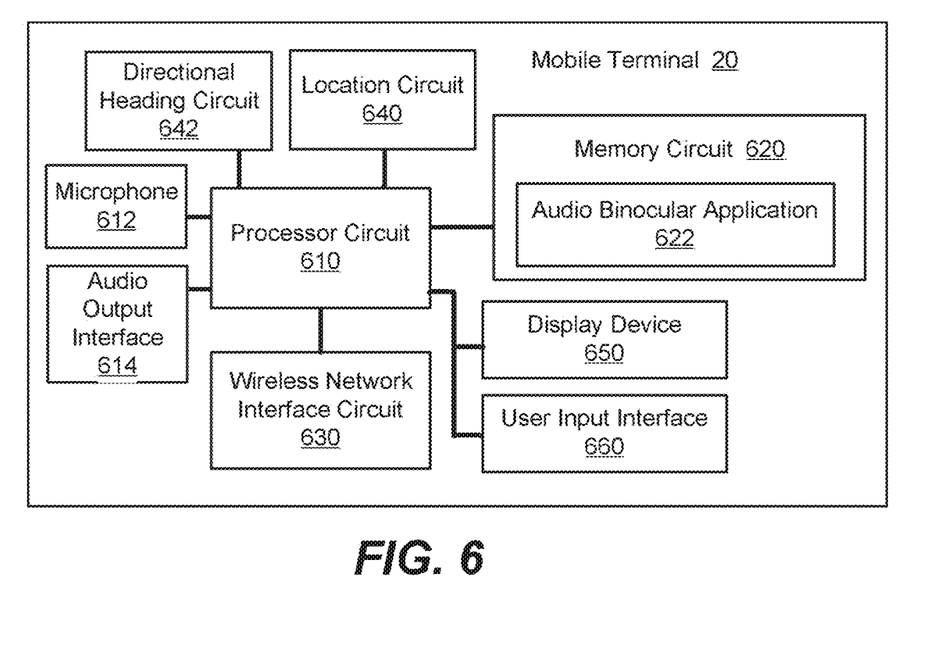
FIG. 6 is a block diagram of components of a mobile terminal which are configured to operate in accordance with some embodiments.

The mobile terminal 20 obtains its present location using a location circuit 640 (FIG. 6) which may receive signals from a satellite positioning system such as GPS, GLONASS, etc. The mobile terminal 20 may also determine its directional heading using a directional heading circuit 642 (e.g., compass, accelerometers, etc.). Mobile terminal 20 determines a listen-ahead distance which defines how far ahead of where the user is traveling with the mobile terminal 20 that the user wants to listen to an audio stream from any microphones that are proximately located to a location at the listen ahead distance from a present location and directional heading of the mobile terminal 20. The mobile terminal 20 may determine the listen-ahead distance based on a velocity of the mobile terminal 20 and/or based on a user setting is defined in the audio binocular application 622 (FIG. 6). For example, the listen-ahead distance may be determined to be 100-200 m when the listener is slowly walking, and may be increased to about 500 m when the listener is running. The listen-ahead distance may be based on the type of environment of the listener. For example, the listen-ahead distance may be determined to be 100-200 m when the listener is in a densely populated city environment, and may be increased to about 500 m when the listener is located in a more open rural environment.

The mobile terminal 20 transmits an audio request message to the server 100, where the audio request message contains the location of the mobile terminal 20 and requests that the server 100 select a microphone from among the plurality of microphones (e.g., 60a-c and 61a-b) responsive to the location of the mobile terminal 20 and the listen-ahead distance.

The server 100 selects a microphone from among the plurality of microphones responsive to the location of the mobile terminal 20 and the listen-ahead distance. The server 100 obtains an audio stream from the selected microphone and communicates audio stream to the mobile terminal 20.

In the example of FIG. 1, a listen-ahead distance 30 has been determined. At first time instant T1, the mobile terminal 20 is located where illustrated. The mobile terminal 20 transmits an audio request message containing its present location to the server 100. The server 100 responsively selects any microphones that are located within listening area 31 defined by the location of the mobile terminal 20 and the listen-ahead distance 30, which corresponds to static microphones 60a and agent mobile terminal microphone 61a, obtains audio streams from the microphones 60a and 61a, combines the audio streams into a combined audio stream, and communicates the combined audio stream to the mobile terminal 20. As will be appreciated, if the listen-ahead distance was sufficiently increased, the server 100 may also select nearby microphones 60b, obtain audio streams therefrom, and combine this additional audio streams into the combined audio stream that is communicated to the mobile terminal 20.

At a next time instant T2, the mobile terminal 20 has moved to location 32. The mobile terminal 20 transmits another audio request message containing its updated location 32 to the server 100. The server 100 responsively selects any microphones that are located within listening area 41 defined by the updated location of the mobile terminal 20 and the listen-ahead distance 30, which corresponds to static microphones 60b and agent mobile terminal microphone 61b. The server 100 obtains audio streams from the microphones 60b and 61b, combines the audio streams into a combined audio stream, and communicates the combined audio stream to the mobile terminal 20.

At a next time instant T3, the mobile terminal 20 has moved to location 42. The mobile terminal 20 transmits another audio request message containing its updated location 42 to the server 100. The server 100 responsively selects any microphones that are located within listening area 51 defined by the updated location of the mobile terminal 20 and the listen-ahead distance 30, which corresponds to static microphones 60c and while continuing use of agent mobile terminal microphone 61b. The server 100 obtains audio streams from the microphones 60c and 61b, combines the audio streams into a combined audio stream, and communicates the combined audio stream to the mobile terminal 20. The rate at which the mobile terminal 20 transmits audio request messages may depend upon the velocity of the mobile terminal 20, e.g., with the rate increasing with velocity. The rate may alternatively be a fixed value. The rate may be controlled by the distributed microphones signal server 100 and/or by another network node of the system.

As will be explained in further detail below, the listen-ahead distance can be defined based on a velocity of the mobile terminal. The listen-ahead distance can provide a user with the perception of traveling through a sound landscape a defined distance or travel time ahead of where the user is presently located. Accordingly, which microphones the server 100 selects for providing audio signals to the user can be dynamically updated based on the present location, directional heading, and velocity of the mobile terminal 20. For example, if a user is running with a speed of 10 km/h (2.8 m/s) and has defined a desired listening-ahead time of 20 s, the corresponding listen-ahead distance is determined to be 56 m. In contrast, when the user slows down to about 6 km/h (1.7 m/s) before and during turning left into a crossing street, the listen-ahead distance shrinks to 33 m and change the heading direction for selecting microphones accordingly.

The operation for selecting microphones can include using a requested fixed listen-ahead distance of, e.g., 100 m, to select microphones that are within a defined proximity thereto, e.g., microphones 100±50 m ahead in the forward direction of a current mobile terminal location are selected to receive audio streams therefrom. Similarly, if the user rotates the mobile terminal 20, e.g., when turning to look in a different direction to cross a street at a nearby pedestrians crossing or when the mobile terminal 20 is part of a headset, the distributed microphones signal server 100 can operate to select a new set of any microphones that are 100±50 m ahead in this updated forward direction. Accordingly, the size and direction of the listening area in which microphones are selected can be dynamically changed based on variation in the mobile terminal velocity, heading, etc.

As explained above, the server 100 can use the velocity or directional velocity of the mobile terminal 20 as the basis for selecting among available microphones. In one embodiment, the mobile terminal 100 determines instructional velocity, and embeds the directional velocity as content in the audio request message that is transmitted for use by the server 100 to select a microphone from among the plurality of microphones. Correspondingly, the server 100 can operate to select 406 a microphone from among the plurality of microphones based on operations that include determining the directional velocity of the mobile terminal 20 responsive to the audio request message, estimating a future location of the mobile terminal 20 responsive to the location of the mobile terminal 20 and to the directional velocity, and selecting the microphone from among the plurality of microphones responsive to proximity of a location of the microphone to the future location of the mobile terminal 20.

Figure 2:
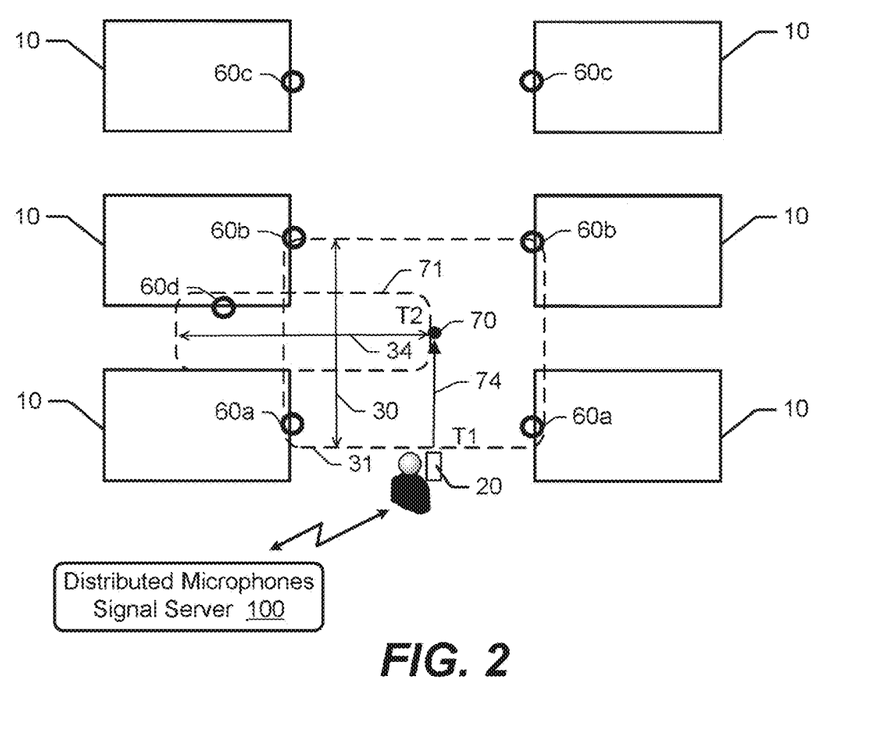
FIG. 2 illustrates another view of the city environment and other operations that are performed by the distributed microphones signal server to select microphones from among the plurality of microphones responsive to the location of a mobile terminal according to some embodiments.

FIG. 2 illustrates another view of the city environment and other operations that are performed by the distributed microphones signal server 100 to select microphones from among the plurality of microphones responsive to the location of a mobile terminal 20 according to some embodiments. More particularly, in the scenario of FIG. 2, at time instant T1 the mobile terminal 20 is traveling toward location 70 which is distance 74 away. The listen-ahead distance is determined to be 30 based on velocity, user defined value, etc. The server 100 selects any microphones that are within listening area 31. At time instant T2, the mobile terminal 20 has turned direction to the left and a new listen-ahead distance of 34 is determined based on, e.g., a greater mobile terminal velocity and/or another user defined value. The server 100 selects any microphones that are within listening area 70 which is now oriented with a major axis perpendicular to the major axis of the earlier listening area 31. The server 100 may define the listening areas to select microphones which are located at intersections ahead of the mobile terminal 20, such as to select microphones at a next intersection that will be reached by the mobile terminal 20 while de-selecting microphones at a previous intersection that is now behind the mobile terminal 20.

Figure 3:
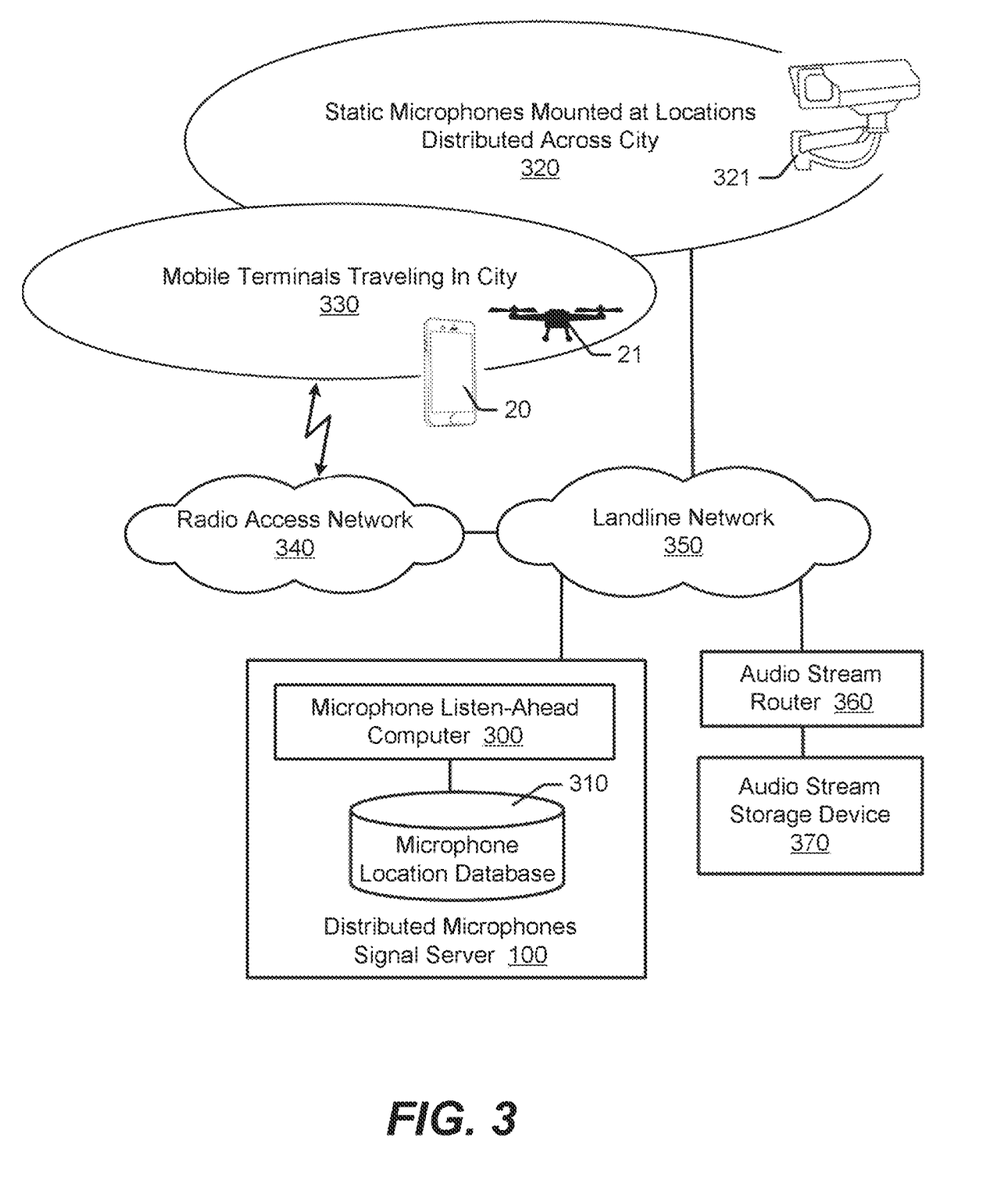
FIG. 3 illustrates a system that includes a plurality of microphones that are networked to a distributed microphones signal server, which maybe further networked to an audio stream router and an audio stream storage device, and which are configured to operate in accordance with some embodiments.

FIG. 3 illustrates a system that includes a plurality of microphones that are networked to the distributed microphones signal server 100, which maybe further networked to an audio stream router 360 and an audio stream storage device 370, and which are configured to operate in accordance with some embodiments.

Referring to FIG. 3, the plurality of microphones are geographically distributed and may include static microphones 320 that are mounted at locations distributed (e.g., microphones of security cameras 321) and/or include agent mobile terminals 20 (e.g., cellular phone, User Equipment, smart watch, tablet computer, wearable computer, etc.) that may carried by persons traveling in the city and/or which may be otherwise relocatable (e.g. flying drones 21 also referred to as unmanned air vehicles (UAVs)). Mobile terminals 330 can include the audio binocular application 622 (FIG. 6) which communicates with the distributed microphones signal server 100 to receive an audio stream from the selected microphone. The mobile terminals 330 may also include a microphone that enables the mobile terminal to be a source of an audio stream that is provided to the server 100 for relay to another mobile terminal. Herein, when a mobile terminal is used as a source of an audio stream it is also referred to as an agent mobile terminal because can is functioning directly or indirectly as an agent of the server 100.

The static microphones 320 may be connected by wired and/or wireless networks, although there are illustrated as being connected through a wired network to a landline network 350. The mobile terminals 330 can be connected through a radio access network 340, such as a cellular network, Wi-Fi network, WiMAX network, etc., to the landline network. Audio streams from the microphones 320 and 330 can be routed through one or both of the networks 340 and 350 directly to the distributed microphones signal server 100. Alternatively, the audio streams from the microphones 320 and 330 can be routed through one or both of the networks 340 and 350 to an audio stream router 360 for storage on an audio stream storage device 370. The server 100 may command the audio stream router 360 to selectively route audio streams for one or more selected microphones to the server 100 for processing and relay to one or more mobile terminals.

As will be explained in further detail below, the server 100 can include a microphone listen-ahead computer 300 that accesses a microphone location database 310 to determine locations of the distributed microphones 320 and 330. The microphone listen-ahead computer 300 selects among the distributed microphones 320 and 330 for providing one or more audio streams therefrom to a mobile terminal.

Figure 4:
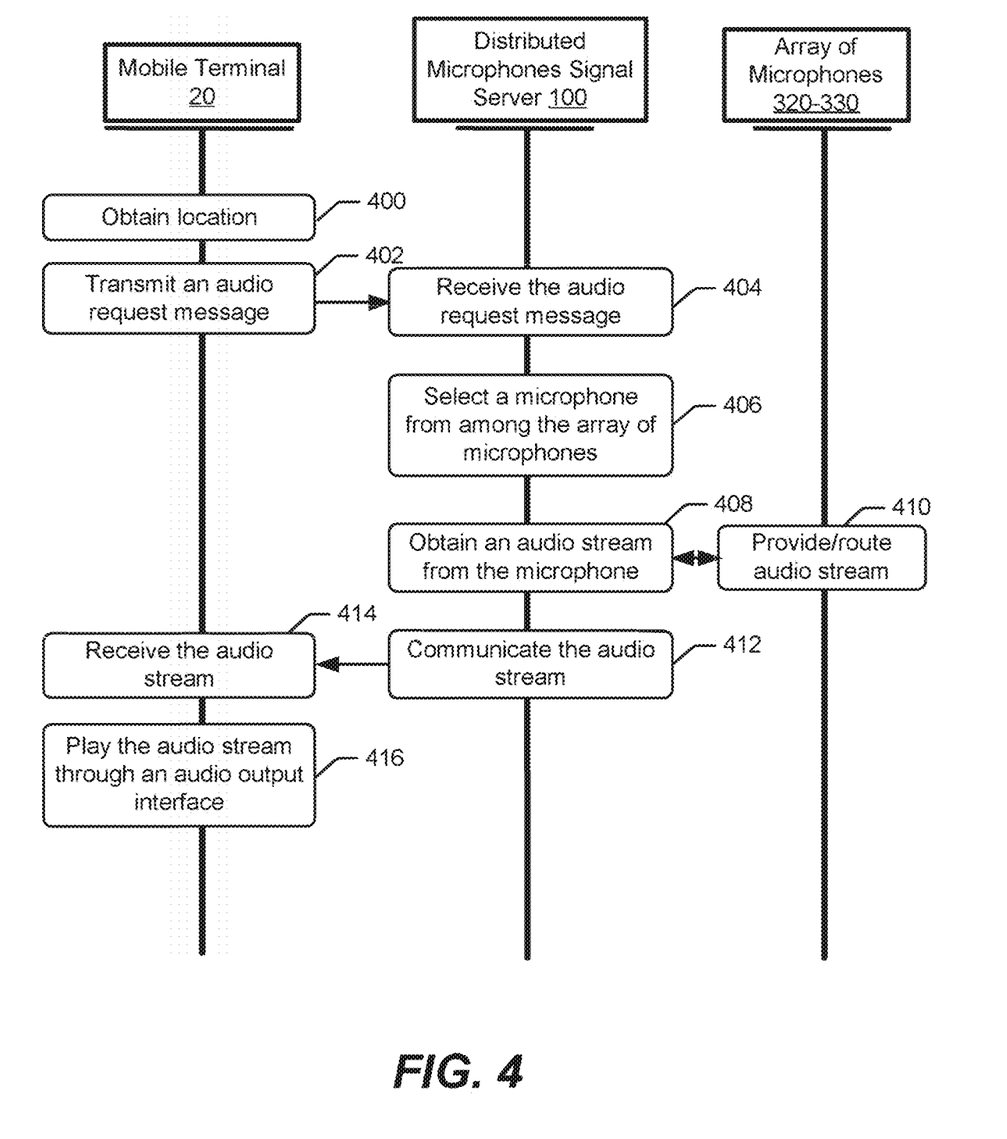
FIG. 4 illustrate a data flow diagram and flowchart of operations by a mobile terminal, a distributed microphones signal server, and a plurality of microphones in accordance with some embodiments.

FIG. 4 illustrate a data flow diagram and flowchart of operations by a mobile terminal 20, a distributed microphones signal server 100, and a plurality of microphones 320 AND 330 in accordance with some embodiments. The operations by the mobile terminal 20 may be performed by the audio binocular application 622 (FIG. 6).

Referring to FIG. 4, the mobile terminal 20 obtains 400 its location and transmits 402 an audio request message to the server 100. The audio request message contains the location of the mobile terminal 20 and requests that the server 100 select a microphone from among a plurality of microphones that are geographically distributed responsive to the location of the mobile terminal 20.

The server 100 receives 404 audio request message and selects 406 a microphone from among the plurality of microphones 320-330 responsive to the location of the mobile terminal 20. The server 100 obtains 408 an audio stream from the microphone that is selected. The server 100 may communicate an audio stream request message to the selected microphone or to the audio stream router 360 to request an audio stream from the selected microphone. The selected microphones or the audio stream router 360 responds to the audio stream request message by providing for routing 410 the audio stream to the server 100. The server 100 communicates 412 the audio stream to the mobile terminal 20. The mobile terminal 20 receives 414 the audio stream and plays the audio stream through the audio output interface 614 (FIG. 6).

The operation by the server 100 to select 406 a microphone from among the plurality of microphones can be based on a directional heading of microphone and a listen-ahead distance which may be determined by the mobile terminal 20 and/or the server 100. In one embodiment, the mobile terminal 20 obtains its directional heading and a listen-ahead distance, and embeds the directional heading and the listen-ahead distance as content in the audio request message that is transmitted 402 for use by the server 100 to select a microphone from among the plurality of microphones. Corresponding operations that can be performed by the server 100 can include determining the location of the mobile terminal, the directional heading of the mobile terminal, and the listen-ahead distance responsive to the audio request message. The server 100 can then determine a listen-ahead area responsive to a combination of the location of the mobile terminal 20, the directional heading of the mobile terminal 20, and the listen-ahead distance, and select the microphone from among the plurality of microphones responsive to proximity of a location of the microphone to the listen-ahead area (e.g., is the microphone within the listen-ahead area).

As explained above, the mobile terminals 20 can include microphones that can be used to provide audio streams that can be selected among by the server 100 for providing to another mobile terminal 20. As explained above, mobile terminals 20 that can be audio stream sources are also referred to as agent mobile terminals 20. The operation to select 406 the microphone from among the plurality of microphones responsive to proximity of a location of the microphone to the future location of the mobile terminal, can include: determining locations of the agent mobile terminals; and selecting one of the agent mobile terminals responsive to proximity of the locations of the agent mobile terminals to the future location of the mobile terminal. The operation to obtain 408 an audio stream from the microphone that is selected, can include: communicating an audio stream request message to the agent mobile terminal that is selected which requests that the agent mobile terminal communicate an audio stream from its microphone to the server 100; and receiving the audio stream from the agent mobile terminal.

The static microphones 320 can include street-level deployed distributed microphones that are configured to report their location and other relevant parameters to the distributed phone signal server 100. The other relevant parameters that may be deported can include, height over ground in which the microphone is mounted, level of background noise sensed by the microphone, characteristics of adjacent microphones that operate to provide a stereo soundfield, characteristics of a microphone's listening direction/directivity, etc. When the static microphones 320 are not moved, the reporting may be performed once upon set up.

The static microphones 320 may provide their respective audio streams responsive to a request from the server 100 or may provide the audio streams continuously without needing request. The server 100 may calculate a distributed soundfield with respect to relative position and directions of the microphones, which may include combining, with sufficient time synchronization performed, audio streams from distributed microphones in a mono-manner that results "left-mid-right" audio channels by assigning left channel audio stream from a left-closest microphone, a right-nearest microphones to the right audio channel, etc. Alternatively, the distributed soundfield may be calculated by combining audio streams from respective microphones in the left-mid-right of the listening-in area with operations that resolve a full three-dimensional stereo sound image. Accordingly, depending on the number of identified distributed microphones in the listening-in area, the server 100 may use less computationally intensive operations to provide the listening-in users with an audio stream from one microphone, or more computationally intensive operations that utilize input from more than one microphone and provide the listening-in user with a merged soundfield from a set of microphones in the listening-in area.

The operation by the server 100 to select 406 one of the static microphones 320 from among the plurality of microphones responsive to proximity of a location of the microphone to the future location of the mobile terminal 20, can include: determining locations of the static microphones 320; and selecting one of the static microphones 320 responsive to proximity of the locations of the static microphones 320 to the future location of the mobile terminal 20. The operation to obtain 408 an audio stream from the microphone that is selected, can include: communicating an audio stream request message to the selected static microphone 320 or to the audio stream router 360 that operates to route audio streams from the static microphones 320 to destination devices, e.g., the stream storage device 370; and receiving the audio stream from the selected static microphone 320.

In some other embodiments, the mobile terminals 330 are monitored to provide a crowd-sourcing approach that enables a massive number of microphones to be available as part of the microphone array that can be selected among by the server 100 for a given area. Because mobile terminals 330 are inherently movable, the mobile terminals 330 can report their location, heading direction, and speed for use by the server 100 to select among the plurality of microphones that are to be used to provide audio streams.

As explained above, the mobile terminals 330 can include drones 21 (also known as UAVs). In the future when the number of city-level airspace drones become more frequent, one possible application of the drones is to carry microphone(s) for certain purposes, such as governmental security and/or commercial purposes. Accordingly, the distributive microphone signal server 100 may be configured to communicate with drones 21 to receive audio streams there from. The server 100 may be further configured to control a microphone equipped drone 21 to fly to a location where an audio stream is needed but no available microphone has been identified.

An example embodiment, when the listening user is traveling or gazing into an area where no static microphones 320 nor agent mobile terminals 330 are identified as being available, a desired/requested (stereo/mono) soundfield cannot be supported. The gaze direction may be determined based on a directional orientation or directional movement sensed by the mobile terminal 20, by headphones worn by the user, and/or by an augmented reality (AR) or virtual reality (VR) headset or other device worn by the user. The server 100 may respond to this situation by controlling a microphone equipped drone 21 to fly to that area to provide audio stream there from for indication to a mobile terminal of the listening user.

In another example embodiment, in an area where insufficient or no static microphones 320 are available, the server 100 may make audio binocular service available by controlling a stereo-microphone equipped drone 21 or a plurality of mono-microphone equipped drones 21 to fly to that area or to continuously relocate to be within an area in which a user should be provided a stereo audio stream.

Within the selected listen-in area at a certain distance/radius, the three-dimensional position of available contributing microphones can be considered to select which microphones will be used as a source of the audio stream that is processed to provide desired soundfield characteristics which may be requested by a listening user.

Combining sound from microphones that are within an area or volume along the listening-in users travel and/or gazing direction can be weighted (adjust volume) with respect to e.g. a distance from the listening user, a distance from the listing-into area, or combinations thereof, for example in a linear or exponential manner, which may configured to mimic human perception of ambient sounds. A listening mobile terminal may experience different sound levels as well as different separation or pan of soundfield depending on the distance from the listening-in area of the sound generating sources. For example a listening mobile terminal at, e.g., 300 m from the listening-in area will hear a more narrow pan and relatively lower volume, and both pan and volume will increase as the listening mobile terminal approaches the sound generating sources.

Depending on the spatial location of selected microphones, the "shape" of desired listen-in area, or rather its associated volume can vary. For example, in one embodiment where stationary microphones 320 are deployed on building walls along a street canyon, a listen-ahead area or "volume" span by the corresponding height (and left/right "width") of the microphones 320 and desired listen-ahead length. In another embodiment where no static microphones 320 are deployed on building walls and only mobile terminals 330 are used at street level, the listen-ahead area can essentially be spread in the street plane, i.e. typically two-dimensional in another embodiment where a microphone enabled drone is selected, a listen-ahead area will now also have volume ranging in the altitude dimension.

In another embodiment, where only mobile terminals 330 which are transported by persons are used, the microphone pick-up area may essentially be spread only in the street plane, whereas if a microphone enabled drone 21 is also used the listen-ahead area is stretched into a three-dimensional volume with a height corresponding to that of the drone 21.

In a further embodiments, gazing distance, distance to listen-ahead area, etc. are established using head orientation. For example, the listen-ahead distance may be increased when the user's head orientation is determined to indicate that the user's gaze is angled above a defined reference (e.g., horizontal reference) and, conversely, may be decreased when the user's head orientation is determined to indicates that the user's gaze is angled below the defined reference. The head orientation may be sensed by a directional circuit 642 in the mobile terminal 20 and/or by sensors in a virtual reality or augmented reality device, such as glasses or headset.

As explained above, the server 100 may determine the size, volume, and/or shape of the listen-ahead area based on the velocity of the mobile terminal 20. For example, higher speed can result in a greater listen-ahead distance and/or greater with and/or height of the listen-ahead area.

In a further embodiment, reproducing sounds from a certain distant location, sound characteristics from said environment or landscape could also be considered; a typical example would be that certain reverb/echo structure is supposed to be present in audial data from a street canyon surrounded by high-rise building with e.g. glassy/metal facades, whereas sound recorded from e.g. Hyde Park potentially should carry significantly less echo and reverb. To mimic this aspect, a central sound processing node could take into consideration said characteristics given the localization of selected sound monitoring microphones and their relative distance to the listening-in user.

Figure 5:
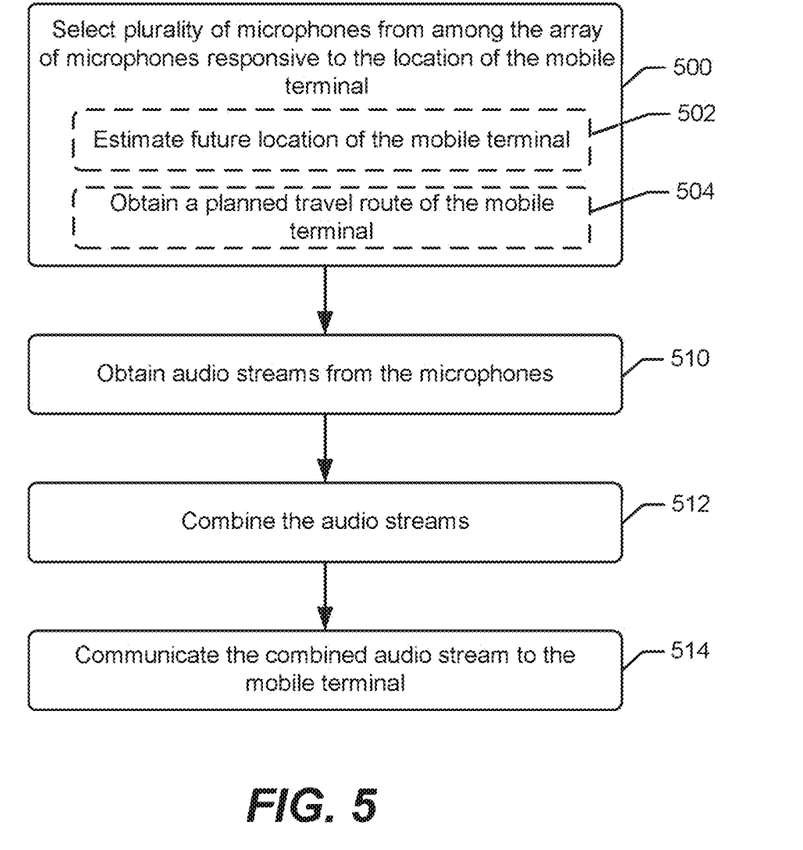
FIG. 5 illustrates a flowchart of operations by a distributed microphones signal server in accordance with some embodiments.

FIG. 5 illustrates a flowchart of operations that may be performed by the distributed microphones signal server 100 to select a plurality of microphones and combine the audio streams there from for use by a mobile terminal 20, in accordance with some embodiments. Referring to FIG. 5, the server 100 may select 500 a plurality of microphones from among the plurality of microphones responsive to the location of the mobile terminal 20. The server 100 obtains 510 audio streams from the plurality of microphones that are selected, and combines 512 the audio streams to generate a combined audio stream. The server 100 communicates 514 the combined audio stream to the mobile terminal 20.

The server 100 may determine a set of future locations of the mobile terminal 20, and select microphones that are approximate to those future locations. The operation to select 500 a plurality of microphones can include determining a directional velocity of the mobile terminal 20 responsive to the audio request message, and estimate 502 a set of future locations of the mobile terminal 20 responsive to the location of the mobile terminal 20 and to the directional velocity of the mobile terminal 20. For each of the future locations in the set, the server 100 selects 500 a microphone from among the plurality of microphones responsive to proximity of the microphone to the future location of the mobile terminal 20.

The server 100 may adjust volume of individual ones of the audio streams responsive to proximity between the selected microphones to the location of the mobile terminal 20. The operation to combine 512 the audio streams to generate a combined audio stream, can include adjusting volume of individual ones of the audio streams responsive to proximity of individual corresponding ones of the selected microphones to the location of the mobile terminal 20.

The server 100 may select among the microphones responsive to a planned travel route that is obtained for the mobile terminal 20. Operations by the server 100 can include obtaining 504 a planned travel route of the mobile terminal 20. The planned travel route can either be obtained from the mobile terminal 20, e.g., from a routing application being executed by the mobile terminal 20, or from a routing server. For instance, if the routing application being executed by the mobile terminal 20 has obtained a travel route from the routing server, it may communicate an identifier which is associated with the obtained travel route to the server 100. The server 100 may use the received identifier to obtain the travel route from the routing server.

A plurality of microphones are selected 500 from among the plurality of microphones responsive to locations along the planned travel route. Audio streams are obtained 510 from the plurality of microphones that are selected, and the audio streams are combined 512 to generate a combined audio stream. The combined audio stream is communicated 514 to the mobile terminal 20.

The server 100 may adjust volume of individual ones of the audio streams when performing the combining responsive to proximity of the selected microphones to the location of the mobile terminal 20. Accordingly, the operation to combine 512 the audio streams to generate a combined audio stream, can include adjusting volume of individual ones of the audio streams responsive to proximity of individual corresponding ones of the plurality of microphones to the location of the mobile terminal 20.

Some other embodiments are directed to privacy aspects that can be performed by the mobile terminal and/or the distributed microphones signal server 100. When mobile terminals 330 are used as microphone sources, privacy issues may arise whereby, for example, users may want to control their audio contribution to an audio binocular feature. For example users may want to define: what geographic areas the feature should be allowed or prohibited; when the audio binocular application 622 should be prevented from running such as when a privacy sensitive application (e.g., phone application) is actively running; request that the user's voice brother near field components of the signal from the microphone are filtered out before being provided to the server 100 for communication to another mobile terminal.

In one embodiment, the mobile terminal filters-out a near-field component of the microphone audio stream before transmission of the audio stream to the server 100.

The operations by the mobile terminal can include receiving an audio stream request message from the distributed microphones signal server 100, and obtaining an audio stream from a microphone of the mobile terminal. The mobile terminal identifies a near-field component of the audio stream, and filters the audio stream to remove the near-field component while leaving a far-field component to generate a filtered audio stream. The mobile terminal transmits the filtered audio stream to the server 100 responsive to the audio stream request message.

In another embodiment, the mobile terminal filters-out a voice component from the microphone audio stream before transmission to the server 100. The operations by the mobile terminal can include receiving an audio stream request message from the server 100, and obtaining an audio stream from a microphone of the mobile terminal. The mobile terminal identifies a voice component of the audio stream, and filters the audio stream to remove the voice component while leaving other components to generate a filtered audio stream. The mobile terminal transmits the filtered audio stream to the server 100 responsive to the audio stream request message.

In another embodiment, the mobile terminal determines whether a privacy sensitive application is running and, if so, prevents transmission of an audio stream to the server 100. The operations by the mobile terminal can include receiving an audio stream request message from the server 100, and determining whether a privacy sensitive application is actively being performed by the mobile terminal. When a privacy sensitive application is determined to be actively performed, mobile terminal prevents transmission of an audio stream from a microphone of the mobile terminal to the server 100 as a response to the audio stream request message. In contrast, when a privacy sensitive application is determined to not be actively performed, the mobile terminal operates to transmit the audio stream from the microphone of the mobile terminal to the distributed microphones signal server as a response to the audio stream request message.

In another embodiment, the user can define a privacy geo-fence within which the mobile terminal will not transmit an audio stream to the server 100. The operations by the mobile terminal can include determining whether the location of the mobile terminal is within a defined geographical area. When the location of the mobile terminal is determined to be within the defined geographical area, the mobile terminal prevents transmission of an audio stream from a microphone of the mobile terminal to the distributed microphones signal server as a response to the audio stream request message. In contrast, when the location of the mobile terminal is determined to not be within the defined geographical area, the mobile terminal operates to transmit the audio stream from the microphone of the mobile terminal to the distributed microphones signal server as a response to the audio stream request message.

In another embodiment, the mobile terminal selectively allows transmission of an audio stream to the server 100 based on whether or not certain known devices are determined to be present. The operations by the mobile terminal can include identifying other mobile terminals that are discoverable by the mobile terminal, and determining whether any of the identified other mobile terminals correspond to an entry in a list of known mobile terminals. When one of the identified other terminals corresponds to an entry in the list of known mobile terminals, the mobile terminal prevents transmission of an audio stream from a microphone of the mobile terminal to the distributed microphones signal server as a response to the audio stream request message. In contrast, when none of the identified other mobile terminals correspond to any entry in the list of known mobile terminals, the mobile terminal operates to transmit the audio stream from the microphone of the mobile terminal to the distributed microphones signal server as a response to the audio stream request message.

Cloud Implementation

Some or all operations described above as being performed by the mobile terminal 20 and/or the distributed microphones signal server 100 may alternatively be performed by another node that is part of a network operator cloud computing resource. For example, those operations can be performed as a network function that is close to the edge, such as in a cloud server or a cloud resource of a telecommunications network operator, e.g., in a CloudRAN or a core network.

Example Mobile Terminal and Distributed Microphones Signal Server

FIG. 6 is a block diagram of components of a mobile terminal 20 that are configured in accordance with some other embodiments of the present disclosure. The mobile terminal 20 can include a wireless network interface circuit 630, a location determination circuit 640, a directional heading circuit 642 (e.g., multi-axis (6 DOF) accelerometers), a microphone 612, an audio output interface 614 (e.g., speaker, headphone jack, wireless transceiver for connecting to wireless headphones), a display device 750, a user input interface 660 (e.g., keyboard or touch sensitive display), at least one processor circuit 610 (processor), and at least one memory circuit 620 (memory). The processor 610 is connected to communicate with other components. The memory 620 stores an audio binocular application 622 that is executed by the processor 610 to perform operations disclosed herein. The processor 610 may include one or more data processing circuits, such as a general purpose and/or special purpose processor (e.g., microprocessor and/or digital signal processor), which may be collocated or distributed across one or more data networks. The processor 610 is configured to execute computer program instructions in the memory 620, described below as a computer readable medium, to perform some or all of the operations and methods for one or more of the embodiments disclosed herein for a mobile terminal.

Figure 7:
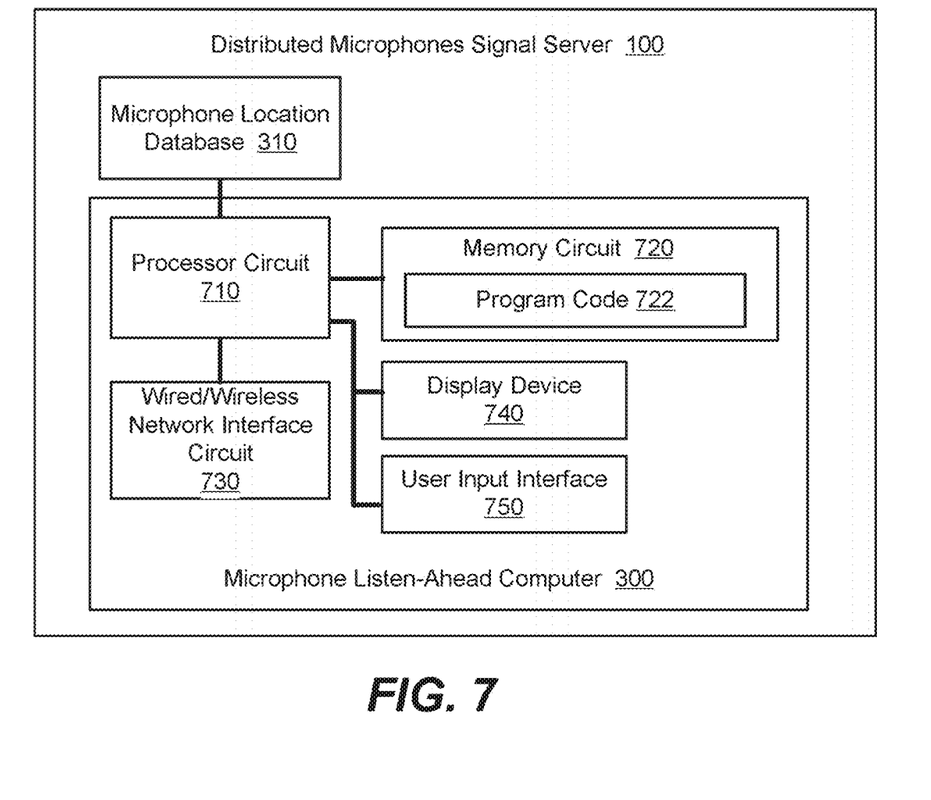
FIG. 7 is a block diagram of components of a distributed microphones signal server which are configured to operate in accordance with some embodiments of the present disclosure.

FIG. 7 is a block diagram of components of the distributed microphones signal server 100 which operate according to at least some embodiments of the present disclosure. The server 100 can include a network interface circuit 730, at least one processor circuit 710 (processor), and at least one memory circuit 720 (memory). The network interface circuit 730 is configured to communicate with distribute camera and mobile terminals via networks which can include wireless and wired networks. The server 100 may further include the microphone location database 310 or may separate therefrom but communicatively networked thereto. The server 100 may further include a display device 740 and a user input interface 750. The memory 720 stores program code 722 that is executed by the processor 710 to perform operations. The processor 710 may include one or more data processing circuits, such as a general purpose and/or special purpose processor (e.g., microprocessor and/or digital signal processor), which may be collocated or distributed across one or more data networks. The processor 710 is configured to execute computer program instructions among program code 722 in the memory 720, described below as a computer readable medium, to perform some or all of the operations and methods for one or more of the embodiments disclosed herein for a map route server.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A distributed microphones signal server comprising:
   a network interface circuit configured to communicate with mobile terminals and a plurality of microphones that are geographically distributed;
   a processor connected to the network interface circuit; and
   a memory storing program code that is executed by the processor to perform operations comprising:
      receiving an audio request message from a mobile terminal which contains a location of the mobile terminal;
      selecting a microphone from among the plurality of microphones by estimating a future location of the mobile terminal responsive to the location of the mobile terminal;
      wherein selecting the microphone from among the plurality of microphones responsive to the location of the mobile terminal comprises:
         determining a directional velocity of the mobile terminal responsive to the audio request message;
         estimating the future location of the mobile terminal responsive to the location of the mobile terminal and to the directional velocity of the mobile terminal; and
         selecting the microphone from among the plurality of microphones responsive to proximity of a location of the microphone to the future location of the mobile terminal;
      obtaining an audio stream from the microphone that is selected; and
      communicating the audio stream to the mobile terminal.

2. The distributed microphones signal server of claim 1, wherein the operation to select a microphone from among the plurality of microphones responsive to the location of the mobile terminal, comprises:
   determining a directional heading of the mobile terminal, and a listen-ahead distance responsive to the audio request message;
   determining a listen-ahead area responsive to a combination of the location of the mobile terminal, the directional heading of the mobile terminal, and the listen-ahead distance; and
   selecting the microphone from among the plurality of microphones responsive to proximity of a location of the microphone to the listen-ahead area.

3. The distributed microphones signal server of claim 1, wherein:
   the plurality of microphones comprises agent mobile terminals having microphones;
   the operation to select the microphone from among the plurality of microphones responsive to proximity of a location of the microphone to the future location of the mobile terminal, comprises:
      determining locations of the agent mobile terminals;
      selecting one of the agent mobile terminals responsive to proximity of the locations of the agent mobile terminals to the future location of the mobile terminal; and
   the operation to obtain an audio stream from the microphone that is selected, comprises:
      communicating an audio stream request message to the selected agent mobile terminal which requests that the agent mobile terminal communicate an audio stream from its microphone to the distributed microphones signal server; and
      receiving the audio stream from the selected agent mobile terminal.

4. The distributed microphones signal server of claim 1, wherein:
   the plurality of microphones comprises static microphones that are mounted at geographically distributed locations;
   the operation to select the microphone from among the plurality of microphones responsive to proximity of a location of the microphone to the future location of the mobile terminal, comprises:
      determining locations of the static microphones;
      selecting one of the static microphones responsive to proximity of the locations of the static microphones to the future location of the mobile terminal; and
   the operation to obtain an audio stream from the microphone that is selected, comprises:
      communicating an audio stream request message to the selected static microphone; and
      receiving the audio stream from the selected static microphone.

5. The distributed microphones signal server of claim 1, wherein the operations performed by the processor further comprise:
- selecting a plurality of microphones from among the plurality of microphones responsive to the location of the mobile terminal;
- obtaining audio streams from the plurality of microphones that are selected;
- combining the audio streams to generate a combined audio stream; and
- communicating the combined audio stream to the mobile terminal.

6. The distributed microphones signal server of claim 5, wherein the operation to select a plurality of microphones from among the plurality of microphones responsive to the location of the mobile terminal, comprises:
- determining a directional velocity of the mobile terminal responsive to the audio request message;
- estimating a set of future locations of the mobile terminal responsive to the location of the mobile terminal and to the directional velocity of the mobile terminal; and
- for each of the future locations in the set, selecting a microphone from among the plurality of microphones responsive to proximity of the microphone to the future location of the mobile terminal.

7. The distributed microphones signal server of claim 6, wherein the operation to combine the audio streams to generate a combined audio stream, comprises:
- adjusting volume of individual ones of the audio streams responsive to proximity of individual corresponding ones of the selected microphones to the location of the mobile terminal.

8. The distributed microphones signal server of claim 1, wherein the operations performed by the processor further comprise:
- obtaining a planned travel route of the mobile terminal;
- selecting a plurality of microphones from among the plurality of microphones responsive to locations along the planned travel route;
- obtaining audio streams from the plurality of microphones that are selected;
- combining the audio streams to generate a combined audio stream; and
- communicating the combined audio stream to the mobile terminal.

9. The distributed microphones signal server of claim 8, wherein the operation to combine the audio streams to generate a combined audio stream, comprises:
- adjusting volume of individual ones of the audio streams responsive to proximity of individual corresponding ones of the plurality of microphones to the location of the mobile terminal.

10. A mobile terminal comprising:
- a wireless network interface circuit;
- a processor connected to the network interface circuit; and
- a memory storing program code that is executed by the processor to perform operations comprising:
  - obtaining a location of the mobile terminal;
  - transmitting an audio request message to a distributed microphones signal server, the audio request message containing the location of the mobile terminal and requesting that the distributed microphones signal server select a microphone from among a plurality of microphones that are geographically distributed by estimating a future location of the mobile terminal responsive to the location of the mobile terminal;
  - wherein selecting the microphone from among the plurality of microphones responsive to the location of the mobile terminal comprises:
    - determining a directional velocity of the mobile terminal responsive to the audio request message;
    - estimating the future location of the mobile terminal responsive to the location of the mobile terminal and to the directional velocity of the mobile terminal; and
    - selecting the microphone from among the plurality of microphones responsive to proximity of a location of the microphone to the future location of the mobile terminal;
  - receiving an audio stream from the microphone that is selected; and
  - playing the audio stream through an audio output interface.

11. The mobile terminal of claim 10, wherein the operations further comprise:
- obtaining a directional heading of the mobile terminal and a listen-ahead distance; and
- embedding the directional heading and the listen-ahead distance as content in the audio request message that is transmitted for use by the distributed microphones signal server to select a microphone from among the plurality of microphones.

12. The mobile terminal of claim 11, wherein the operations further comprise:
- obtaining a velocity of the mobile terminal; and
- determining the listen-ahead distance responsive to the velocity of the mobile terminal.

13. The mobile terminal of claim 10, wherein the operations further comprise:
- obtaining a directional velocity of the mobile terminal; and
- embedding the directional velocity as content in the audio request message that is transmitted for use by the distributed microphones signal server to select a microphone from among the plurality of microphones.

14. The mobile terminal of claim 10, wherein the operations further comprise:
- receiving an audio stream request message from the distributed microphones signal server;
- obtaining an audio stream from a microphone of the mobile terminal;
- identifying a near-field component of the audio stream;
- filtering the audio stream to remove the near-field component while leaving a far-field component to generate a filtered audio stream; and
- transmitting the filtered audio stream to the distributed microphones signal server responsive to the audio stream request message.

15. The mobile terminal of claim 10, further comprising a microphone, wherein the operations further comprise:
- receiving an audio stream request message from the distributed microphones signal server;
- obtaining an audio stream from the microphone;
- identifying a voice component of the audio stream;
- filtering the audio stream to remove the voice component while leaving other components to generate a filtered audio stream; and
- transmitting the filtered audio stream to the distributed microphones signal server responsive to the audio stream request message.

16. The mobile terminal of claim 10, wherein the operations further comprise:
receiving an audio stream request message from the distributed microphones signal server;
determining whether a privacy sensitive application is actively being performed by the mobile terminal;
when a privacy sensitive application is determined to be actively performed, preventing transmission of an audio stream from a microphone of the mobile terminal to the distributed microphones signal server as a response to the audio stream request message; and
when a privacy sensitive application is determined to not be actively performed, transmitting the audio stream from the microphone of the mobile terminal to the distributed microphones signal server as a response to the audio stream request message.

17. The mobile terminal of claim 10, wherein the operations further comprise:
determining whether the location of the mobile terminal is within a defined geographical area;
when the location of the mobile terminal is determined to be within the defined geographical area, preventing transmission of an audio stream from a microphone of the mobile terminal to the distributed microphones signal server as a response to the audio stream request message; and
when the location of the mobile terminal is determined to not be within the defined geographical area, transmitting the audio stream from the microphone of the mobile terminal to the distributed microphones signal server as a response to the audio stream request message.

18. The mobile terminal of claim 10, wherein the operations further comprise:
identifying other mobile terminals that are discoverable by the mobile terminal;
determining whether any of the identified other mobile terminals correspond to an entry in a list of known mobile terminals;
when one of the identified other mobile terminals corresponds to an entry in the list of known mobile terminals, preventing transmission of an audio stream from a microphone of the mobile terminal to the distributed microphones signal server as a response to the audio stream request message; and
when none of the identified other mobile terminals correspond to any entry in the list of known mobile terminals, transmitting the audio stream from the microphone of the mobile terminal to the distributed microphones signal server as a response to the audio stream request message.

19. A method by a distributed microphones signal server comprising:
receiving an audio request message from a mobile terminal which contains a location of the mobile terminal;
selecting a microphone from among a plurality of microphones that are geographically distributed by estimating a future location of the mobile terminal responsive to the location of the mobile terminal;
wherein selecting the microphone from among the plurality of microphones responsive to the location of the mobile terminal comprises:
determining a directional velocity of the mobile terminal responsive to the audio request message;
estimating the future location of the mobile terminal responsive to the location of the mobile terminal and to the directional velocity of the mobile terminal; and
selecting the microphone from among the plurality of microphones responsive to proximity of a location of the microphone to the future location of the mobile terminal;
obtaining an audio stream from the microphone that is selected; and
communicating the audio stream to the mobile terminal.

20. A method by a mobile terminal comprising:
obtaining a location of the mobile terminal;
transmitting an audio request message to a distributed microphones signal server, the audio request message containing the location of the mobile terminal and requesting that the distributed microphones signal server select a microphone from among a plurality of microphones that are geographically distributed by estimating a future location of the mobile terminal responsive to the location of the mobile terminal;
wherein selecting a microphone from among the plurality of microphones responsive to the location of the mobile terminal comprises:
determining a directional velocity of the mobile terminal responsive to the audio request message;
estimating the future location of the mobile terminal responsive to the location of the mobile terminal and to the directional velocity of the mobile terminal; and
selecting the microphone from among the plurality of microphones responsive to proximity of a location of the microphone to the future location of the mobile terminal;
receiving an audio stream from the microphone that is selected; and
playing the audio stream through an audio output interface.

* * * * *